United States Patent
Bennett et al.

(10) Patent No.: US 6,578,383 B2
(45) Date of Patent: *Jun. 17, 2003

(54) APPARATUS AND METHOD FOR ROLL BENDING HEATED GLASS SHEETS

(75) Inventors: Terry A. Bennett, Northwood, OH (US); Paul D. Ducat, Perrysburg, OH (US); Robert W. Brown, Millbury, OH (US)

(73) Assignee: Glasstech, Inc., Perrysburg, OH (US)

( * ) Notice: Subject to any disclaimer, the term of this patent is extended or adjusted under 35 U.S.C. 154(b) by 39 days.

This patent is subject to a terminal disclaimer.

(21) Appl. No.: 09/884,394

(22) Filed: Jun. 19, 2001

(65) Prior Publication Data

US 2002/0189291 A1 Dec. 19, 2002

(51) Int. Cl.[7] ............................................. C03B 23/25
(52) U.S. Cl. .............................. 65/106; 65/273; 65/287
(58) Field of Search .......................... 65/104, 106, 107, 65/273, 287, 370.1, 374.11, 374.12, 374.13

(56) References Cited

U.S. PATENT DOCUMENTS

| | | |
|---|---|---|
| 3,615,338 A | 10/1971 | Boyles |
| 3,881,906 A | 5/1975 | Ritter, Jr. et al. |
| 3,951,634 A | 4/1976 | Hall et al. |
| 4,119,427 A | 10/1978 | Revells |
| 4,139,359 A | 2/1979 | Johnson et al. |
| 4,218,232 A | 8/1980 | Wilhelm |
| 4,226,608 A | 10/1980 | McKelvey |
| 4,236,907 A | 12/1980 | Mairlot |
| 4,305,746 A | 12/1981 | Hagedorn et al. |
| 4,312,661 A | 1/1982 | Hagedorn et al. |
| 4,396,410 A | 8/1983 | Hagedorn et al. |
| 4,493,724 A | 1/1985 | Schwarzenberg et al. |
| 4,496,386 A | 1/1985 | Hymore et al. |
| 4,508,556 A | 4/1985 | Bennett et al. |
| 4,540,426 A | 9/1985 | Bocelli et al. |
| 4,556,406 A | 12/1985 | Kahle |
| 4,557,745 A | 12/1985 | Halberschmidt et al. |
| 4,586,946 A | 5/1986 | Kramer et al. |
| 4,872,898 A | 10/1989 | Enk et al. |
| 4,992,088 A | 2/1991 | Sassanelli et al. |
| 5,009,693 A | 4/1991 | Freidel et al. |
| 5,246,477 A | 9/1993 | Kramer |
| 5,292,356 A | 3/1994 | Herrington et al. |
| 5,368,625 A | 11/1994 | Mizusugi |
| 5,545,245 A | 8/1996 | Mizusugi |
| 5,656,055 A | 8/1997 | Frank et al. |
| 5,695,538 A | 12/1997 | Goolsbay et al. |
| 5,735,922 A | 4/1998 | Woodward et al. |
| 5,833,729 A | 11/1998 | Meunier et al. |
| 5,849,056 A | 12/1998 | May et al. |
| 5,992,180 A | 11/1999 | Tsuchiya et al. |

FOREIGN PATENT DOCUMENTS

FR 2 221 409 10/1974

*Primary Examiner*—Sean Vincent
(74) *Attorney, Agent, or Firm*—Brooks & Kushman P.C.

(57) ABSTRACT

Apparatus (16) and a method for roll bending heated glass sheets includes a pair of sets of bending rolls (40) and a support and drive mechanisms (44) that supports and rotatively drives the bending rolls at progressively increasing inclinations within a heating chamber (32) of a roll bending station (18) to provide engagement and bending at opposite lateral sides of a conveyed glass sheet. The bending rolls (44) are positioned in their progressively inclined inclinations by cooperation of an elongated connector (60) and clamps (64) for providing securement to curved support ribs (48) of an associated frame at the adjacent lateral side of the roll bending station housing.

15 Claims, 4 Drawing Sheets

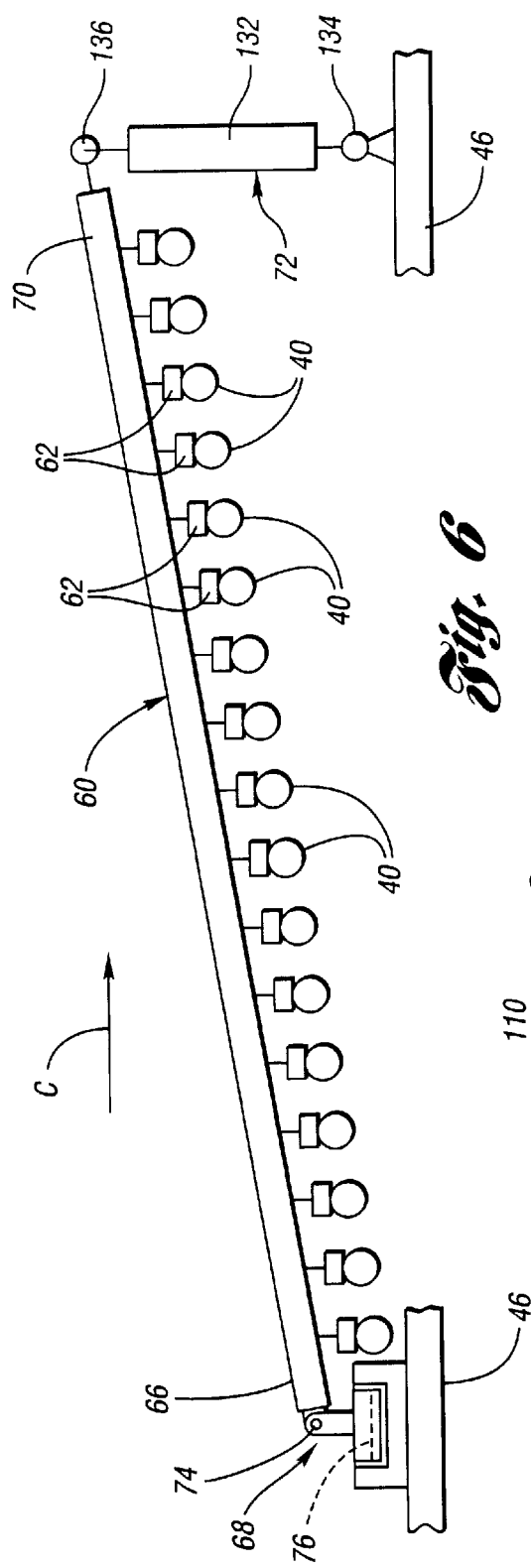
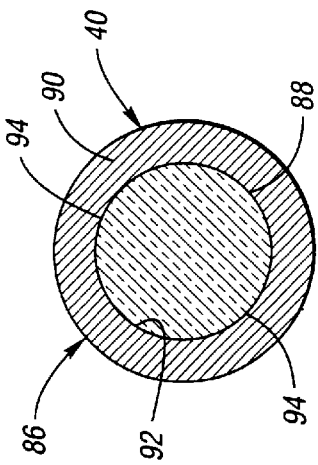
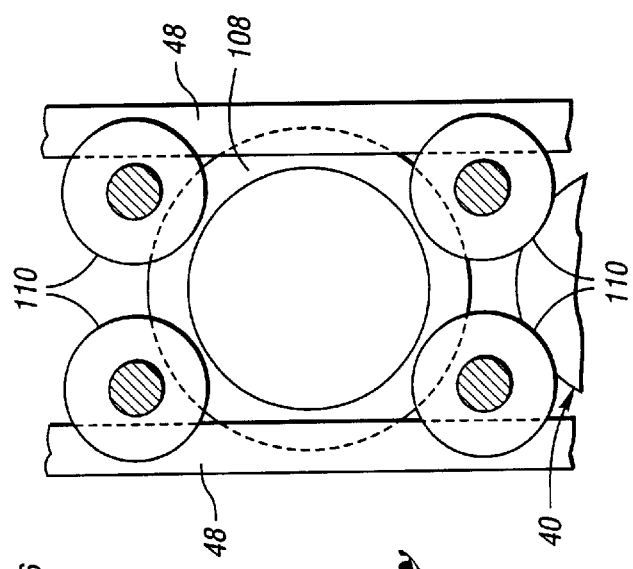
Fig. 6
Fig. 8
Fig. 7

APPARATUS AND METHOD FOR ROLL BENDING HEATED GLASS SHEETS

BACKGROUND OF THE INVENTION

1. Field of the Invention

This invention relates to apparatus and to a method for roll bending heated glass sheets.

2. Background Art

Glass sheets have previously been bent by a conveyor roll bending station that is located downstream from a heating furnace such as disclosed by U.S. Pat. Nos. 5,368,625 Mizusugi and 5,545,245 Mizusugi. These patents disclose a roll bending station having horizontal rolls and laterally spaced sets of inclined rolls downstream from the furnace with the inclined rolls provided in sets having progressively increasing inclination along the direction of conveyance to form each heated glass sheet during conveyance over the inclined rolls.

As disclosed by French Patent 2221409 of inventor Maurice Nedelec, heated glass sheets have also previously been bent by conveyor rolls that are supported and rotatively driven outside of a furnace heating chamber with ends projecting inwardly into the furnace initially in a horizontal orientation. All of the rolls are subsequently simultaneously tilted to form the heated glass sheet within the heated chamber.

SUMMARY OF THE INVENTION

One object of the present invention is to provide improved apparatus for roll bending heated glass sheets.

In carrying out the above object, the apparatus for roll bending heated glass sheets in accordance with the invention includes a roll bending station having a heating chamber that is communicated with the interior of a furnace in which glass sheets are conveyed along a direction of conveyance for heating in preparation for bending. A roll conveyor of the apparatus has horizontal extending conveyor rolls that are rotatively driven and spaced horizontally within the heating chamber of the roll bending station along the direction of conveyance extending laterally with respect thereto to support and convey a heated glass sheet to be bent. The roll bending station has a pair of sets of bending rolls that are spaced laterally with respect to each other along the direction of conveyance. A bending roll support and drive mechanism is located externally of the heating chamber to support and rotatively drive each set of bending rolls which extend into the furnace with the bending rolls of each set at progressively increasing inclinations along the direction of conveyance to engage opposite lateral sides of the conveyed glass sheet within the heating chamber and provide bending thereof along a direction transverse to the direction of conveyance.

The roll support and drive mechanism of the roll bending apparatus includes a frame mounted externally at each lateral side of the furnace and has curved support ribs. The roll support and drive mechanism also includes an elongated connector that extends at an inclination along each lateral side of the furnace and provides connection of the adjacent bending rolls to each other. Clamps secure the bending rolls to the curved support ribs to provide the progressive increasing inclination of the bending rolls along the direction of conveyance.

Each elongated connector of the roll support and drive mechanism has an upstream end including a connection for mounting thereof on the associated frame and has a downstream end including an adjustor for adjusting the elevation thereof with respect to the frame to adjust the inclination of the bending rolls. The connection of the upstream end of each elongated connector is a universal connection that permits the adjustment of the inclination of the roll connector and pivoting thereof about its elongated direction as the inclination of the bending rolls is adjusted.

The construction of each bending roll includes a tubular support having a connection to the associated elongated connector. Antifriction bearings are supported by the tubular connector and support a metallic roll support for rotation. A refractory bending roll member of each bending roll is mounted by the metallic roll support member, preferably by a hole in one end thereof that receives the refractory bending roll member with an adhesive providing securement. Another end of the metallic roll support member includes a drive member for rotatively driving the bending roll.

The construction of the clamps that secure the bending rolls to the curved support ribs of the frame include frustoconical clamp members and a clamp actuator that selectively provides clamping of the frustoconical clamp members to the curved support ribs and unclamping thereof to permit adjustment of the inclination of the bending rolls. More specifically, each bending roll clamp includes a single frustoconical clamp member located on one side of a pair of the curved support ribs and a plurality of frustoconical clamp members located on the opposite side of the pair of curved support ribs from the single frustoconical clamp member. The clamp actuator operates between the single frustoconical clamp member and the plurality of frustoconical clamp members to selectively provide clamping thereof against the pair of curved support ribs and positioning of the bending rolls or unclamping thereof to permit adjustment of the inclination of the bending rolls.

The roll bending apparatus also includes an adjustor that provides lateral adjustment of the frames of the bending roll support and drive mechanism with respect to the furnace to accommodate bending of glass sheets of different sizes.

Another object of the present invention is to provide an improved method for roll bending heated glass sheets.

In carrying out the immediately preceding object, the method for roll bending heated glass sheets in accordance with the invention is performed by conveying a glass sheet within a furnace heating chamber along a direction of conveyance for heating to a bending temperature. The conveyance of the heated glass sheet is continued within the heating chamber on rotatively driven horizontally extending rolls adjacent an exit end of the heating chamber and by supporting a pair of sets of bending rolls externally of the heating chamber at opposite lateral sides thereof with bending rolls of each set projecting into the furnace with progressively increasing inclinations along the direction of conveyance. The sets of bending rolls are rotatively driven to engage opposite lateral sides of the conveyed glass sheet to provide bending thereof along a direction transverse to the direction of conveyance.

In performing the roll bending method, the bending rolls are clamped to curved support ribs to provide the support thereof with progressively increasing inclinations along the direction of conveyance and are unclamped from the curved support ribs to permit adjustment of the inclination.

The sets of bending rolls in performing the roll bending method are also laterally adjusted with respect to the direction of conveyance to accommodate bending of glass sheets of different sizes.

The objects, features and advantages of the present invention are readily apparent from the following detailed description of the preferred embodiment when taken in connection with the accompanying drawings.

BRIEF DESCRIPTION OF THE DRAWINGS

FIG. 6 is a somewhat schematic view that illustrates a connector that provides support of an associated set of bending rolls.

FIG. 7 is a view taken along the direction of line 7—7 in FIG. 5 to illustrate the manner in which the bending rolls are clamped to curved support ribs by frustoconical clamp members.

FIG. 8 is a sectional view taken along the direction of line 8—8 in FIG. 5 to illustrate the manner in which a metallic support member of each bending roll supports a refractory roll member thereof on which the glass sheets are bent.

DETAILED DESCRIPTION OF THE PREFERRED EMBODIMENTS

Figure 1:
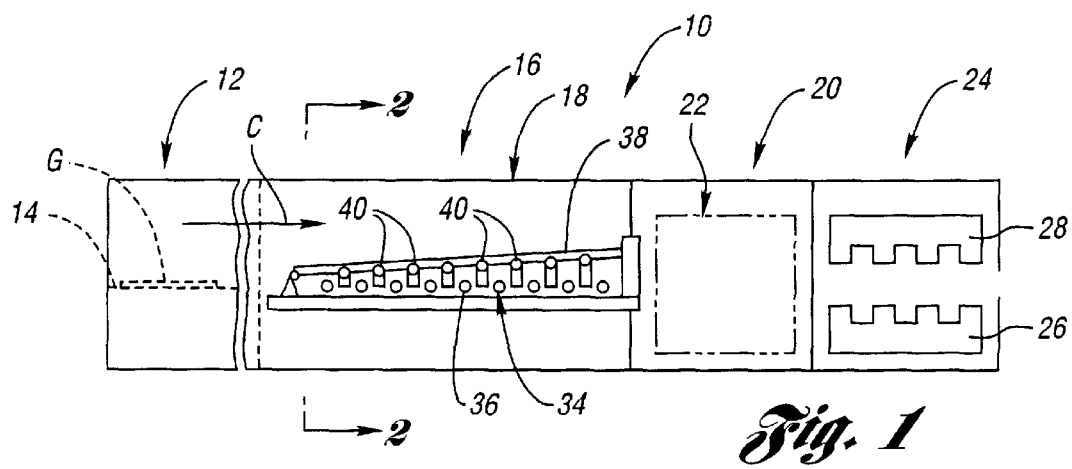
FIG. 1 is a side elevational view of a glass sheet processing system which includes roll bending apparatus constructed in accordance with the present invention.

With reference to FIG. 1, a glass sheet processing system generally indicated by 10 includes a furnace 12 having a conveyor 14 on which glass sheets G are heated for bending, roll bending apparatus 16 including a roll bending station 18 for roll bending the heated glass sheets in accordance with the present invention, a press bending station 20 including a press bender 22 for press bending the roll bent glass sheets, and a quench station 24 including lower and upper quench heads between which the finally formed glass sheet is positioned for rapid cooling that toughens the glass sheet. The quenching toughens the glass sheet by providing a tensioned glass center and surfaces in compression to increase bending strength and prevent breakage. The rate of quenching may be more moderate to provide heat strengthening or greater to provide tempering.

It should be appreciated that the roll bending apparatus 16 of this invention has use with various systems in addition to the one illustrated. For example, the furnace 12 that provides heating of the glass sheet may include a roll conveyor 14 or may include a gas hearth conveyor on which the glass sheets G proceed along a direction of conveyance illustrated by Arrow C. As the heated glass sheets pass through the roll bending apparatus 16, a curvature is imparted to the glass sheets along a direction transverse to the direction of conveyance as is hereinafter more fully described, and the press bending station 20 may then operate to provide additional curvature transverse to the direction of conveyance, additional curvature along the direction of conveyance, or additional curvature both transverse to and along the direction of conveyance. It is also possible for the roll bending apparatus 16 to be utilized without any press bending station. After all of the bending is complete, the quench station 24 is utilized to supply upwardly and downwardly directed quenching gas from lower and upper quench heads 26 and 28 and rapidly cool the glass sheet to provide toughening of the glass sheet, although the roll bending apparatus can also be utilized without any such rapid cooling in applications where annealing of glass is required with slow cooling.

Both the roll bending apparatus 16 and its method of glass sheet roll bending will be described in an integrated manner in order to facilitate an understanding of all aspects of the invention.

Figure 2:
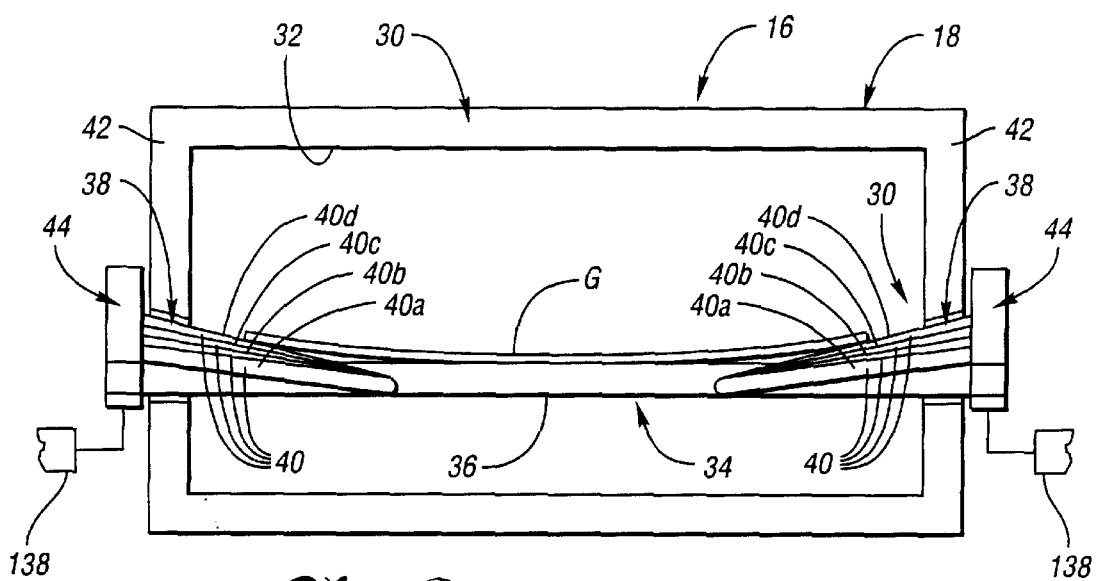
FIG. 2 is a cross sectional view taken along the direction of line 2—2 in FIG. 1 through a roll bending station of the apparatus to illustrate a pair of sets of laterally spaced bending rolls that have increased inclinations along the direction of conveyance to provide bending of a heated glass sheet as is conveyed through the roll bending station.

With reference to FIG. 2, the roll bending station 18 of the apparatus 16 has an insulated housing 30 that defines a heating chamber 32 that is communicated with the interior of the associated furnace such that the glass sheets are not subjected to cooling by the environment prior to the roll bending. The roll bending station 18 may be constructed within an exit end of the furnace or as a separate unit that is attached to the exit end of the furnace and communicated with its interior in order to prevent the ambient cooling prior to the roll bending. A roll conveyor 34 of the apparatus has horizontally extending conveyor rolls 36 that are rotatively driven and spaced horizontally within the heating chamber 32 of the roll bending station along the direction of conveyance extending laterally with respect thereto to support and convey a heated glass sheet to be bent. The roll bending station 18 also has a pair of sets 38 of bending rolls 40 that are spaced laterally with respect to each other along the direction of conveyance at opposite lateral sides 42 of the insulated housing. A bending roll support and drive mechanism 44 is located externally of the heating chamber to support and rotatively drive the sets of bending rolls 40. More specifically, the support and drive mechanism 44 supports and rotatively drives the bending rolls 40 of each set at progressively increasing inclinations along the direction of conveyance as illustrated by $40_a$, $40_b$, $40_c$, and $40_d$, etc.

For example, in a five foot length of the bending station, 18 of the bending rolls 40 with a diameter of about 1 inch alternate with 18 of the horizontal conveyor rolls 36 with a diameter of about 2 inches, and there is only about 1/16 of an inch spacing between the rolls. While the lateral center of the conveyed glass sheet is supported by the center of the horizontal conveyor rolls 36, the increasing inclinations of the bending rolls 40 along the direction of conveyance provides engagement thereof with opposite lateral sides of the conveyed glass sheet within the heating chamber 32 to provide bending of the glass sheet along a direction transverse to the direction of conveyance as illustrated in FIG. 2. Greater inclination of the bending rolls 40 thus provides greater bending transverse to the direction of conveyance. Also, the smaller diameter bending rolls 40 are rotatively driven at a greater rate than the larger diameter horizontal conveyor rolls 36 so as to have the same roll surface speeds at the glass contact locations.

Figure 3:
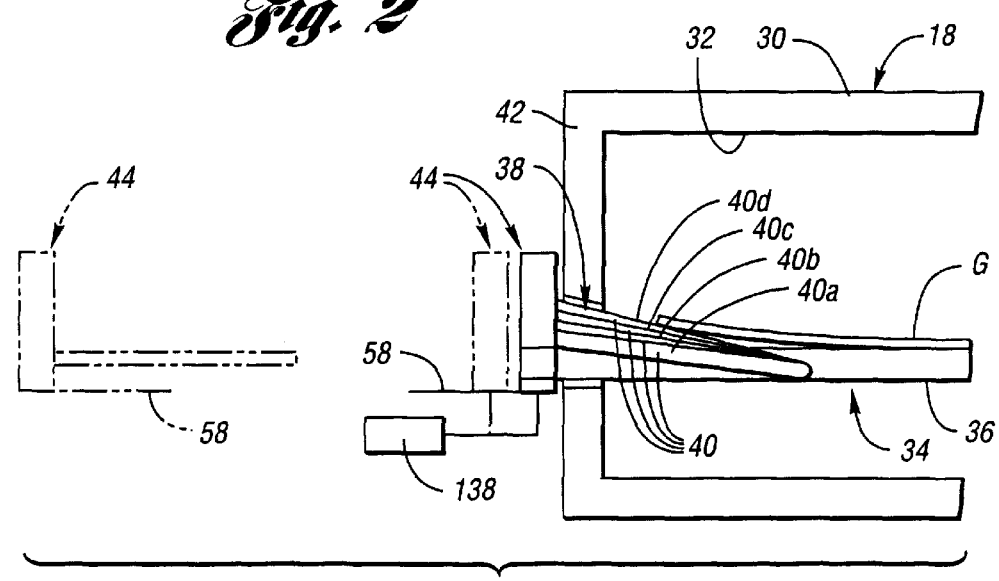
FIG. 3 is a partial cross sectional view of the roll bending station taken in the same direction as FIG. 2 but showing the manner in which each set of bending rolls is adjustable to accommodate for bending of glass sheets of different sizes and movable away from the roll bending station for maintenance and repair.
Figure 4:
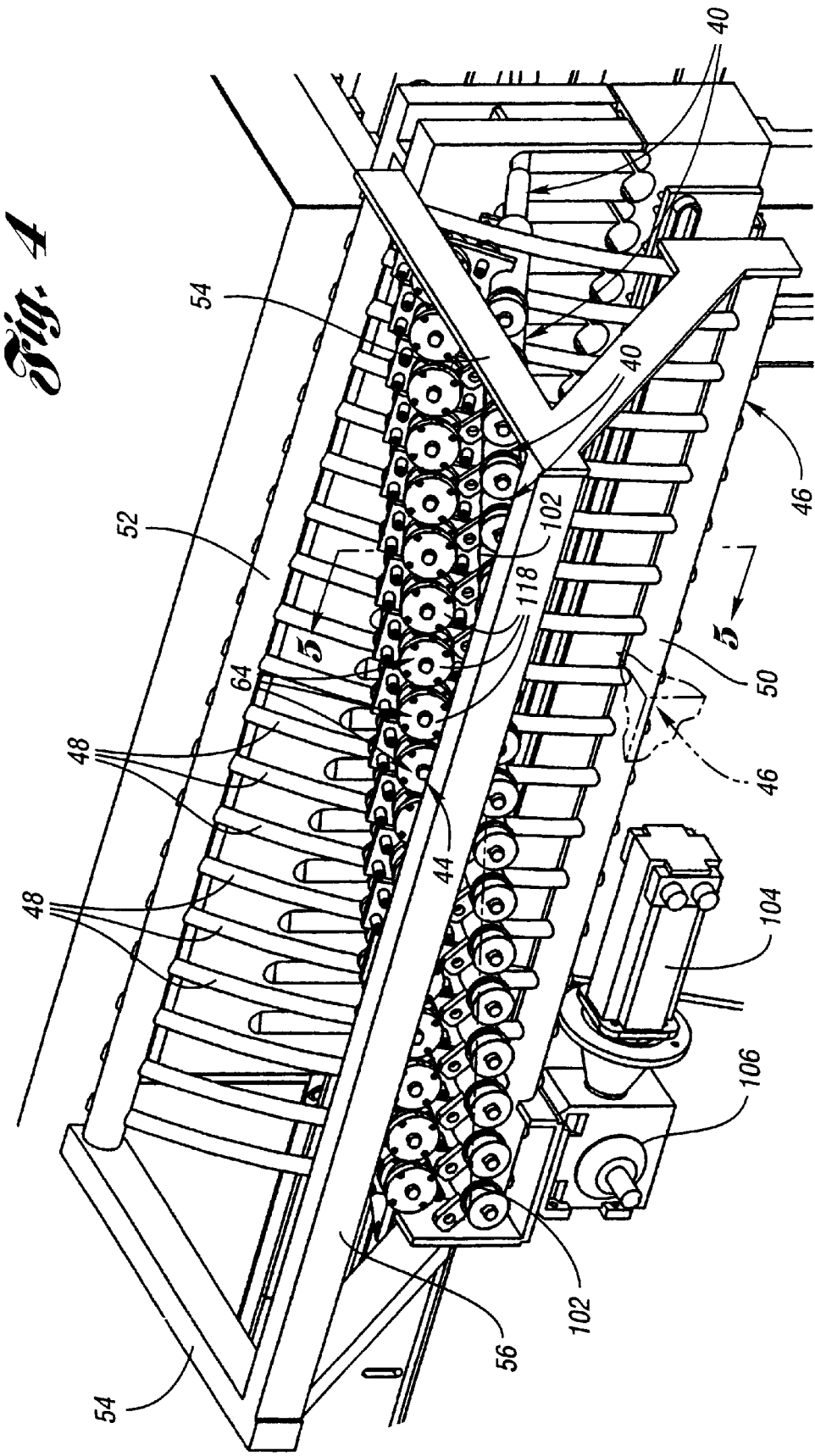
FIG. 4 is a perspective view that illustrates the inclined construction of each set of bending rolls.
Figure 5:
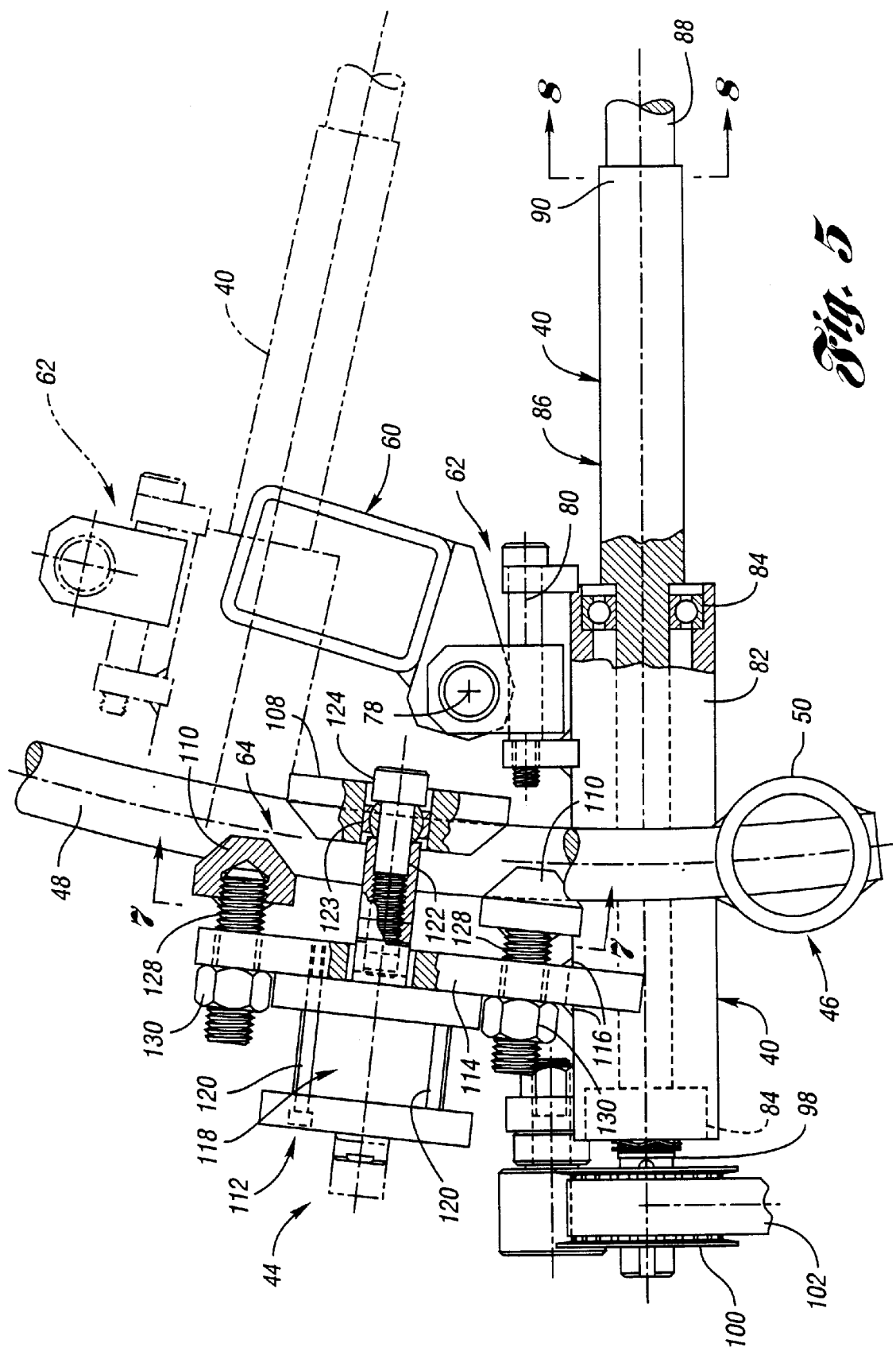
FIG. 5 is a view taken along the direction of line 5—5 in FIG. 4 to further illustrate the manner in which the bending rolls are supported and rotatively driven.

As illustrated in FIGS. 4 and 5, the roll support and drive mechanism 44 includes frames 46 one of which is mounted externally at each lateral side 42 of the bending station furnace. Each frame 46 has curved support ribs 48 with lower ends that are supported by a longitudinally extending lower frame member 50 and with upper ends that are supported by a longitudinally extending upper frame member 52. End frame members 54 having sideways opening V shapes extend between the lower and upper frame members 50 and 52 and are connected at their outboard location by a longitudinally extending outboard frame member 56. A slideway 58 (FIG. 3) mounts the frame 46 for lateral movement with respect to the direction of conveyance toward and away from the adjacent lateral side 42 of the roll bending station 18 as it is hereinafter more fully described.

At each lateral side of the roll bending station, the roll support and drive mechanism 44 illustrated in FIGS. 4 and 5 includes an elongated connector 60 that extends as shown in FIG. 6 at an inclination along the adjacent lateral side of the furnace housing and provides connection of the bending rolls 40 to each other. More specifically, each bending roll 40 has a universal connection 62 to the elongated connector 60 as is hereinafter more fully described in connection with FIG. 5.

As illustrated in FIGS. 4, 5 and 7, clamps 64 secure the bending rolls 40 to the curved support ribs 48 to provide the progressively increasing inclination of the bending rolls along the direction of conveyance in a securely positioned manner.

As illustrated in FIG. 6, the elongated connector 60 has an upstream end 66 including a connection 68 for mounting thereof on the associated frame 46 and has a downstream end 70 having an adjustor 72 for adjusting the elevation thereof with respect to the frame to adjust the inclination of the bending rolls 40 along the direction of conveyance. The connection 68 is a universal connection that mounts the upstream end 66 of the elongated connector for rotation about orthogonal axes 74 and 76 so as to permit pivoting of the connector and rotation about its elongated direction during the adjustment about the curved support ribs. Likewise, the universal connection 62 of each bending roll 40 to the elongated connector 60 as shown in FIG. 5 provide pivoting thereof about orthogonal axes 78 and 80.

With continuing reference to FIG. 5, each bending roll 40 includes a tubular support 82 that is secured by the associated universal connection 62 to the elongated connector 60 so as to permit the pivoting about the orthogonal axes 78 and 80. Antifriction bearings 84 are supported by the tubular support 82 at opposite ends thereof and rotatively support a metallic roll support member 86. A refractory bending roll member 88 of each bending roll is mounted by the associated metallic roll support member 86 and projects into the heating chamber of the roll bending station to provide the glass sheet roll bending as previously described. This refractory bending roll member is preferably made from sinter bonded fused silica particles so as to have minimal thermal warpage upon heating within the heating chamber of the roll bending station.

As illustrated by combined reference to FIGS. 5 and 8, the metallic roll support member 86 has one end 90 including a hole 92 that receives the refractory bending roll member 98 which is secured by a suitable high temperature adhesive 94. The metallic roll support member 86 also has another end 98 shown in FIG. 5 as including a drive member 100 that is rotatively driven by a continuous drive belt 102 under impetus of an electric drive motor 104 (FIG. 4) through a gear unit 106.

As illustrated in FIGS. 4, 5 and 7, the clamps 64 that secure the bending rolls 40 to the curved support ribs 48 of the frame include frustoconical clamp members 108 and 106 and a clamp actuator 112 that selectively provides clamping of the frustoconical clamp members to the curved support ribs 48 in a secured manner or unclamping therefrom to permit adjustment of the inclination of the bending rolls. More specifically, each bending roll clamp 64 includes a single frustoconical clamp member 108 that is located on one side of an adjacent pair of the curved support ribs 48, and each bending roll clamp includes four of the frustoconical clamp members 110 located on the opposite side of the pair of curved support ribs 48 from the single frustoconical clamp member 108. A clamp support plate 114 is secured by welds 116 to the tubular support 82 of the associated bending roll 40. The clamp actuator 112 is illustrated as being embodied by a pneumatic cylinder 118 that is secured by attachment bolts 120 to the plate 114 and has a piston connecting rod 122 with a spherical bearing 123 secured by a bolt connection 124 to the single frustoconical member 108. The other four frustoconical clamp members 110 are each mounted by a threaded shaft 128 and a locknut 130 in cooperation with a threaded hole through the plate 114 with the frustoconical shape thereof opposing the frustoconical shape of the single frustoconical clamp member 108. Operation of the pneumatic cylinder 118 of actuator 112 thus moves the frustoconical clamp members 108 and 110 with respect to each other to provide clamping of their frustoconical shapes against the curved support ribs 48 to secure the position of the associated bending roll 40 and to permit unclamping thereof for adjustment of the inclination of the bending rolls as previously described.

As illustrated in FIG. 6, the adjuster 72 of the connector 60 may be embodied by a linear electric motor 132 for providing the adjustment of the inclination of the bending rolls. Spherical connections 134 and 136 connect the linear electric motor 132 to the frame 46 and the end 70 of the connector 60.

As illustrated in FIGS. 2 and 3, an actuator 138 provides lateral adjustment of the roll support and drive mechanism with respect to the furnace to accommodate bending of glass sheets of different sizes. As previously mentioned, the bending roll support and drive mechanisms 44 can also be moved on the slideway 58 manually to a further outboard position for maintenance and repair as illustrated in FIG. 3 after first adjusting the inclination of the bending rolls 40 to the horizontal position.

Suitable seals are utilized at each lateral side 42 of the insulated housing 30 of the roll bending station 18 to prevent excessive heat loss.

Another system incorporating the roll bending station, a press bending station that can be used to provide the press bending, and a quench station for quenching the glass sheets are respectively disclosed by U.S. patent applications: Ser. No. 09/884,848; Ser. No. 09/884,847; and Ser. No. 09/884,843, all of which were filed concurrently herewith and the entire disclosures of which are hereby incorporated by reference.

While the preferred embodiment and method of operation thereof have been described in detail, those familiar with the art to which this invention relates will recognize various alternative ways of practicing the invention as defined by the following claims.

What is claimed is:

1. Apparatus for roll bending heated glass sheets comprising:
   a roll bending station having a heating chamber that is communicated with the interior of a furnace in which glass sheets are conveyed along a direction of conveyance for heating in preparation for bending;
   a roll conveyor having horizontally extending conveyor rolls that are rotatively driven and spaced horizontally within the heating chamber of the roll bending station along the direction of conveyance extending laterally with respect thereto to support and convey a heated glass sheet to be bent;

the roll bending station having a pair of sets of bending rolls that are spaced laterally with respect to each other along the direction of conveyance; and a bending roll support and drive mechanism located externally of the heating chamber to support and rotatively drive the sets of bending rolls which extend into the furnace with the bending rolls of each set at progressively increasing inclinations along the direction of conveyance to engage opposite lateral sides of the conveyed glass sheet within the heating chamber and provide bending thereof along a direction transverse to the direction of conveyance.

2. Apparatus for roll bending heated glass sheets as in claim 1 wherein the roll support and drive mechanism includes a frame mounted externally at each lateral side of the furnace and having curved support ribs, the roll support and drive mechanism including an elongated connector that extends at an inclination along each lateral side of the furnace and providing connection of the adjacent bending rolls to each other, and clamps that secure the bending rolls to the curved support ribs to provide the progressively increasing inclination of the bending rolls along the direction of conveyance.

3. Apparatus for roll bending heated glass sheets as in claim 2 wherein each elongated connector has an upstream end including a connection for mounting thereof on the associated frame, and each elongated connector having a downstream end including an adjuster for adjusting the elevation thereof with respect to the frame to adjust the inclination of the bending rolls.

4. Apparatus for roll bending heated glass sheets as in claim 3 wherein the connection of the upstream end of each elongated connector is a universal connection that permits the adjustment of the inclination of the roll connector and pivoting thereof about its elongated direction as the inclination of the bending rolls is adjusted.

5. Apparatus for roll bending heated glass sheets as in claim 4 wherein each bending roll includes a tubular support having a connection to the associated elongated connector, antifriction bearings supported by the tubular support, a metallic roll support member mounted for rotation by the antifriction bearings, and a refractory bending roll member mounted by the metallic roll support member.

6. Apparatus for roll bending heated glass sheets as in claim 5 wherein the metallic roll support member of each bending roll has one end including a hole that receives the refractory bending roll member, an adhesive that secures the refractory roll member within the metallic roll support member, and the metallic roll support member having another end including a drive member for rotatively driving the bending roll.

7. Apparatus for roll bending heated glass sheets as in claim 5 wherein the clamps that secure the bending rolls to the curved support ribs of the frame include frustoconical clamp members and a clamp actuator that selectively provides clamping of the frustoconical clamp members to the curved support ribs and unclamping thereof to permit the adjustment of the inclination of the bending rolls.

8. Apparatus for roll bending heated glass sheets as in claim 7 wherein each bending roll clamp includes a single frustoconical clamp member located on one side of a pair of the curved support ribs, each bending roll clamp including a plurality of frustoconical clamp members located on the opposite side of the pair of curved support ribs from the single frustoconical clamp member, and the clamp actuator operating between the single frustoconical clamp member and the plurality of frustoconical clamp members to selectively provide clamping thereof against the pair of curved support ribs and positioning of the bending rolls or unclamping thereof to permit adjustment of the inclination of the bending rolls.

9. Apparatus for roll bending heated glass sheets as in claim 1 further including an adjuster that provides lateral adjustment of the bending roll support and drive mechanism with respect to the furnace to accommodate bending of glass sheets of different sizes.

10. Apparatus for roll bending heated glass sheets comprising:

a roll bending station having a heating chamber that is communicated with the interior of a furnace in which glass sheets are conveyed along a direction of conveyance for heating in preparation for bending;

a roll conveyor having horizontally extending conveyor rolls that are rotatively driven and spaced horizontally within the heating chamber of the roll bending station along the direction of conveyance extending laterally with respect thereto to support and convey a heated glass sheet to be bent;

the roll bending station having a pair of sets of bending rolls that are spaced laterally with respect to each other along the direction of conveyance;

a bending roll support and drive mechanism located externally of the heating chamber to support and rotatively drive the sets of bending rolls which extend into the furnace with the bending rolls of each set at progressively increasing inclinations along the direction of conveyance to engage opposite lateral sides of the conveyed glass sheet within the heating chamber and provide bending thereof along a direction transverse to the direction of conveyance;

the roll support and drive mechanism including a frame mounted externally at opposite lateral sides of the furnace and having curved support ribs, the roll support and drive mechanism including an elongated connector that extends at each lateral side of the furnace at an inclination to provide connection of the bending rolls to each other, and clamps that secure the bending rolls to the curved support ribs to provide the progressively increasing inclination of the bending rolls along the direction of conveyance; and an adjuster that provides lateral adjustment of each frame with respect to the furnace to accommodate bending of glass sheets of different sizes.

11. Apparatus for roll bending heated glass sheets comprising:

a roll bending station having a heating chamber that is communicated with the interior of a furnace in which glass sheets are conveyed along a direction of conveyance for heating in preparation for bending;

a roll conveyor having horizontally extending conveyor rolls that are rotatively driven and spaced horizontally within the heating chamber of the roll bending station along the direction of conveyance extending laterally with respect thereto to support and convey a heated glass sheet to be bent;

the roll bending station having a pair of sets of bending rolls that are spaced laterally with respect to each other along the direction of conveyance;

a bending roll support and drive mechanism located externally of the heating chamber to support and rotatively drive the sets of bending rolls which extend into the furnace with the bending rolls of each set at progressively increasing inclinations along the direction of conveyance to engage opposite lateral sides of the conveyed glass sheet within the heating chamber and provide bending thereof along a direction transverse to the direction of conveyance;

the roll support and drive mechanism including a frame mounted externally at opposite lateral sides of the furnace and having curved support ribs, the roll support and drive mechanism including an elongated connector that extends at each lateral side of the furnace at an inclination to provide connection of the bending rolls to each other, each elongated connector having an upstream end including a universal connection for mounting thereof on the associated frame and having a downstream end including an adjuster for adjusting the elevation thereof with respect to the frame to adjust the inclination of the bending rolls, clamps that secure the bending rolls to the curved support ribs to provide the progressively increasing inclination of the bending rolls along the direction of conveyance, the clamps that secure the bending rolls to the curved support ribs of the frame including frustoconical clamp members and a clamp actuator that selectively provides clamping of the frustoconical clamp members to the curved support ribs and unclamping thereof to permit the adjustment of the inclination of the bending rolls;

each bending roll including a tubular support having a connection to the associated elongated connector, antifriction bearings supported by the tubular support, a metallic roll support member mounted for rotation by the antifriction bearings, a refractory bending roll member mounted by the metallic roll support member, the metallic roll support member of each bending roll having one end including a hole that receives the refractory bending roll member, an adhesive that secures the refractory roll member within the metal roll support member, and the metallic roll support member having another end including a drive member for rotatively driving the bending roll; and an adjuster that provides lateral adjustment of each bending roll support and drive mechanism with respect to the furnace to accommodate bending of glass sheets of different sizes.

12. A method for roll bending heated glass sheets comprising:

conveying a glass sheet within a furnace heating chamber along a direction of conveyance for heating to a bending temperature;

continuing to convey the heated glass sheet within the heating chamber on rotatively driven horizontally extending rolls adjacent an exit end of the heating chamber;

supporting a pair of sets of bending rolls externally of the heating chamber at opposite lateral sides thereof with the bending rolls of each set projecting into the furnace with progressively increasing inclinations along the direction of conveyance; and rotatively driving the sets of bending rolls which engage opposite lateral sides of the conveyed glass sheet to provide bending thereof along a direction transverse to the direction of conveyance.

13. A method for roll bending heated glass sheets as in claim 12 wherein the bending rolls are clamped to curved support ribs to provide the support thereof with progressively increasing inclinations along the direction of conveyance and are unclamped from the curved support ribs to permit adjustment of the inclination.

14. A method for roll bending heated glass sheets as in claim 12 wherein the sets of bending rolls are laterally adjusted with respect to the direction of conveyance to accommodate bending of glass sheets of different sizes.

15. A method for roll bending heated glass sheets comprising:

conveying a glass sheet within a furnace heating chamber along a direction of conveyance for heating to a forming temperature;

continuing to convey the heated glass sheet within the heating chamber on rotatively driven horizontally extending rolls adjacent an exit end of the heating chamber;

clamping a pair of sets of bending rolls to curved support ribs externally of the heating chamber at opposite lateral sides thereof with the bending rolls of each set projecting into the furnace with progressively increasing inclinations along the direction of conveyance;

rotatively driving the sets of bending rolls which engage opposite lateral sides of the conveyed glass sheet to provide bending thereof along a direction transverse to the direction of conveyance; and laterally adjusting the pair of sets of bending rolls with respect to the direction of conveyance to accommodate bending of glass sheets of different sizes.

\* \* \* \* \*